UNITED STATES PATENT OFFICE

DANIEL JOSEPH KENNEDY, OF VANCOUVER, BRITISH COLUMBIA, CANADA

TREATMENT OF COFFEE

No Drawing. Application filed March 14, 1929. Serial No. 347,191.

My invention relates to improvements in in the treatment of coffee and is a continuation-in-part of the application filed by me in the United States of America Patent Office under Serial Number 284,884, and dated June 12th, 1928.

The objects of the invention are to render the coffee capable of imparting a more delicious aroma and flavour than is obtained from coffee in its usual form, to render it more nutritious and to reduce the stimulating effect. Further objects are to change in part the caffeine content from a stimulating drug to a soothing sedative, which makes the coffee more suitable as a beverage, especially to persons of nervous temperament. A further object is to effect such chemical changes in the coffee as will produce the above results by a process which is simple and is unattended with serious expense and which will enable the treatment to be completed in a short period of time. A still further object is to add to the coffee a distinctive flavour and to so seal the pores of the roasted berry subsequent to grinding that all the volatile oils are retained therein, so that exposure of the coffee to the atmosphere will not unduly affect or impair the flavour of the coffee beverage produced therewith.

The invention consists of treating the green berry to a solution of citric and or other similar acid, and roasting it subsequent to said treatment, as will be more fully described in the following specification.

I take the green berry of any desired kind or blend and subject it to a solution of citric or tartaric acid or both, which serves to neutralize the distasteful and bitter element which I find to exist mainly in the skin or outer casing of the berry. This acid solution appears also to destroy the skin or covering and so exposes the pores of the berry that the penetration by the acid is easily and quickly accomplished.

In my prior application I steeped the green berries in a solution for extended periods, which caused the coffee to expand materially and necessitated extensive fanning to dry the coffee and restore it to its normal size prior to roasting, but by my present method I either steep or spray the berry or support it in a suitable sieve and permit the acid solution to percolate through it for a period varying generally from 15 to 30 minutes according to the kind and condition of the berry. The berry during this period absorbs sufficient acid to effect changes in its constituent elements, such as the caffeine and appears to break up the alkaloids and cause a mingling of the coffee acids and salts, some of which appear to be protein in character, in such a manner that the stimulating effect of the caffeine is destroyed and the aromatic and nutritious characteristics of the coffee are highly developed. The coffee berry is then subjected to a process such as fanning or passing warm air through it to remove its moisture without increasing its temperature materially and when dried is roasted in the usual way. The coffee thus processed when ground and subjected to percolation or boiling, is found to produce a beverage which is highly aromatic and is possessed of a more delicious flavour than the coffee now usually sold, and therefore this process may rightly be considered as complete in itself, but insofar as ground coffee is subject to deterioration when exposed to the atmosphere I find it desirable, if the coffee is for household use, or for use where a portion of it is liable to exposure for any length of time, to seal the pores of the granulated berry with any substance which will prevent the escape of its volatile oils.

For the purpose of sealing the pores of the coffee and adding to the resulting beverage a distinctive flavour I add cocoa or chocolate thereto in such quantity as may be desired and agitate the combined ingredients until the coffee is thoroughly coated. I find that when a slight cocoa or chocolate only flavour is desired, that by passing the coffee and the cocoa or chocolate through rollers to which a pressure is applied, the sealing of the pores is more expeditiously and thoroughly performed than by the agitation process above referred to.

It will be obvious that if no other flavour than that of the coffee is desired, that the sealing of its granules may be effected by subjecting it to an albuminous solution or a coating with a finely ground meal or other substantially flavourless substance which is capable of expansion on becoming impregnated with the natural oils of the coffee and adherence thereto to close its pores. When the coffee which has been coated is subjected to boiling water to produce the coffee beverage, the coating or sealing substance is dislodged from the granular berry so that the soluble elements of the coffee may freely escape therefrom and mix with the water, thus producing a coffee from which none of the essential oils or flavouring matter has been lost by exposure.

What I claim as my invention is:

1. The process of treating coffee which consists of subjecting it to a dilute citric acid, of roasting it and coating the coffee with a product of the cocoa bean.

2. The process of treating coffee which consists of taking the green berry and subjecting it to a fruit acid solution and of drying the berry prior to roasting.

3. The process of treating coffee which consists of taking the green berry and subjecting it to a fruit acid for less than one hour and of drying the berry prior to roasting.

4. The process of treating coffee which consists of taking the green berry and subjecting it to a fruit acid solution, of drying, roasting and grinding the berry and of sealing the pores of the roasted and ground berry.

DANIEL JOSEPH KENNEDY.